(12) United States Patent
Choi et al.

(10) Patent No.: US 12,113,997 B2
(45) Date of Patent: Oct. 8, 2024

(54) METHOD FOR TILE GROUP IDENTIFICATION

(71) Applicant: TENCENT AMERICA LLC, Palo Alto, CA (US)

(72) Inventors: Byeongdoo Choi, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/745,824

(22) Filed: Jan. 17, 2020

(65) Prior Publication Data

US 2020/0236377 A1 Jul. 23, 2020

Related U.S. Application Data

(60) Provisional application No. 62/795,526, filed on Jan. 22, 2019.

(51) Int. Cl.
*H04N 19/174* (2014.01)
*H04N 19/119* (2014.01)
*H04N 19/129* (2014.01)
*H04N 19/176* (2014.01)
*H04N 19/44* (2014.01)
*H04N 19/46* (2014.01)
*H04N 19/70* (2014.01)

(52) U.S. Cl.
CPC ......... *H04N 19/44* (2014.11); *H04N 19/119* (2014.11); *H04N 19/129* (2014.11); *H04N 19/176* (2014.11); *H04N 19/46* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 2013/0101035 A1 | 4/2013 | Wang et al. | |
| 2014/0079126 A1* | 3/2014 | Ye | H04N 19/17 375/240.16 |
| 2017/0289556 A1* | 10/2017 | Hendry | H04N 19/30 |
| 2017/0318288 A1* | 11/2017 | Wu | H04N 19/70 |
| 2017/0347109 A1* | 11/2017 | Hendry | H04N 19/119 |

(Continued)

FOREIGN PATENT DOCUMENTS

WO  WO 2020117919  * 4/2019 ........... H04N 19/119

OTHER PUBLICATIONS

JVET document titled "On Tile Grouping" Doucment: JVET-M0853-v2, uploaded on Jan. 12, 2019.*

(Continued)

*Primary Examiner* — James T Boylan
(74) *Attorney, Agent, or Firm* — Morgan, Lewis & Bockius LLP

(57) ABSTRACT

Methods and systems for decoding a video stream are provided, a method comprises receiving a coded video stream comprising a picture partitioned into a plurality of tile groups, each of the plurality of tile groups include at least one tile, the coded video stream further comprising a first indicator that indicates whether a tile group of the plurality of tile groups has a rectangular shape; identifying whether the tile group of the picture has the rectangular shape based on the first indicator; and reconstructing, forwarding, or discarding the tile group.

20 Claims, 13 Drawing Sheets

(56) References Cited

U.S. PATENT DOCUMENTS

| | | |
|---|---|---|
| 2020/0213588 A1* | 7/2020 | Chen ................ H04N 19/91 |
| 2021/0058633 A1* | 2/2021 | Pettersson ............ H04N 19/70 |
| 2021/0235082 A1* | 7/2021 | Lee .................. H04N 19/70 |
| 2021/0314577 A1* | 10/2021 | Hendry ............... H04N 19/70 |
| 2021/0314611 A1* | 10/2021 | Iguchi ................ H04N 19/46 |
| 2023/0027997 A1* | 1/2023 | Deshpande .......... H04N 19/167 |

OTHER PUBLICATIONS

International Search Report for PCT/US2020/14355 dated Apr. 29, 2020.

Written Opinion of the International Searching Authority for PCT/US2020/14355 dated Apr. 29, 2020.

Office Action issued Jun. 21, 2022 in Japanese Application No. 2021-531271.

Deshpande et al., "On Tile Grouping", Joint Video Experts Team (JVET) of ITU-T SG 16 WP 3 and ISO/IEC JTC 1/SC 29/WG 11, JVET-M0853-v2, 13th Meeting, Marrakech, MA, Jan. 9-18, 2019 (9 pages total).

Chen et al., "AHG17: Flexible tile grouping for VVC", Joint Video Experts Team (JVET) of ITU-T SG 16 WP 3 and ISO/IEC JTC 1/SC 29/WG 11, JVET-M0160-v2, 13th Meeting, Marrakech, MA, Jan. 9-18, 2019 (9 pages total).

Deshpande, "On Tile Information Signalling", Joint Video Experts Team (JVET) of ITU-T SG 16 WP 3 and ISO/IEC JTC 1/SC 29/WG 11, JVET-M0416, 13th Meeting, Marrakech, MA, Jan. 9-18, 2019 (10 pages total).

Office Action dated Jan. 24, 2023 issued by the Japanese Patent Office in Japanese Application No. 2021-531271.

Byeongdoo Choi et al., "AHG12: On tile group identification for VVC", Joint Video Experts Team (JVET) of ITU-T SG 16 WP 3 and ISO/IEC JTC 1/SC 29/WG 11, 2019, JVET-M0155, 13th Meeting: Marrakech, MA, Jan. 9-18, pp. 1-3 (4 pages total).

Benjamin Bross et al., "Versatile Video Coding (Draft 4)", Joint Video Experts Team (JVET) of ITU-T SG 16 WP 3 and ISO/IEC JTC 1/SC 29/WG 11, JVET-M1001-v7, 13th Meeting, Marrakech, MA, Jan. 9-18, 2019 (299 pages total).

Extended European Search Report issued Sep. 26, 2022 in European Application No., 20744858.0.

Tencent Technology, Korean Office Action, KR Patent Application No. 10-2021-7015574, Feb. 15, 2024, 7 pgs.

* cited by examiner

FIG. 5A
(Conventional)
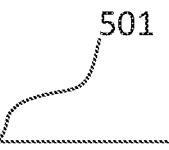
FIG. 5B
(Conventional)
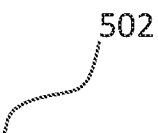

FIG. 7

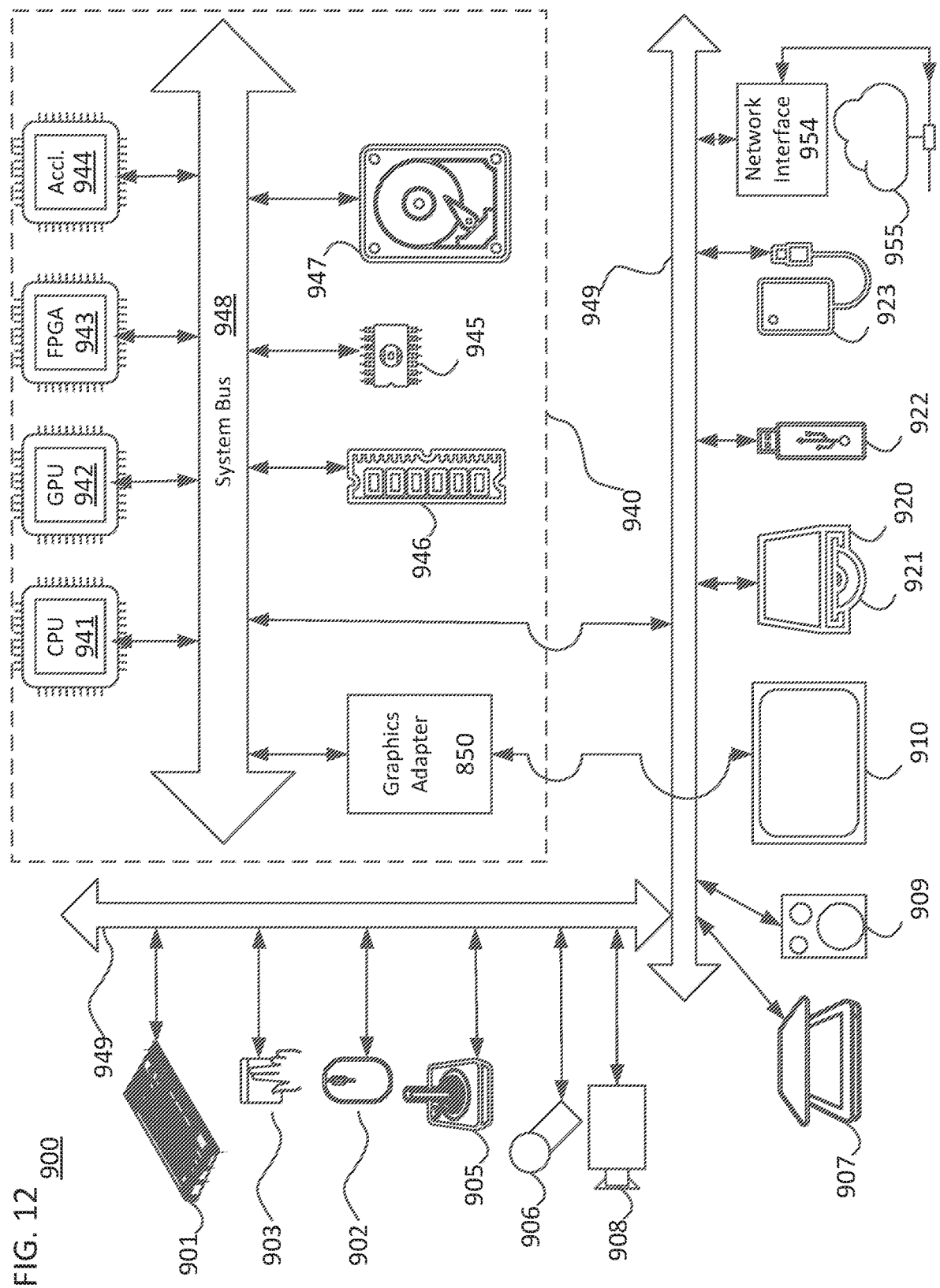

METHOD FOR TILE GROUP IDENTIFICATION

CROSS-REFERENCE TO RELATED APPLICATION

This application claims priority from U.S. Provisional Application No. 62/795,526, filed on Jan. 22, 2019, the disclosure of which is incorporated herein by reference in its entirety.

FIELD

The disclosed subject matter relates to video coding and decoding, and more specifically, to techniques for signaling and identification of tile and tile group structures for pictures of coded video.

BACKGROUND

Video coding and decoding using inter-picture prediction with motion compensation has been previously used. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz, Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reduce aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal may be small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

The concept of dividing a coded video bitstream into packets for transportation over packet networks has been previously used. Early on, video coding standards and technologies were, in their majority, optimized for bit-oriented transport and defined bitstreams. Packetization occurred in system layer interfaces specified, for example, in Real-time Transport Protocol (RTP-) payload formats. With the advent of Internet connectivity suitable for mass-use of video over the Internet, the video coding standards reflected that prominent use case through the conceptual differentiation of a video coding layer (VCL) and a network abstraction layer (NAL). NAL units were introduced in H.264 in 2003, and have been retained in certain video coding standards and technologies since then with only slight modifications.

A NAL unit can, in many cases, be seen as the smallest entity on which a decoder can act upon without necessarily having decoded all preceding NAL units of a coded video sequence. Insofar, NAL units enable certain error resilience technologies as well as certain bitstream manipulation techniques, to include bitstream pruning, by Media Aware Network Elements (MANEs) such as Selective Forwarding Units (SFUs) or Multipoint Control Units (MCUs).

FIGS. 5A-B depict syntax diagrams of some of the syntax of NAL unit headers in accordance with H264 (501) and H265 (502), in both cases without any of their respective extensions. In both cases, the forbidden_zero_bit is a zero bit used for start code emulation prevention in certain system layer environments. The nal_unit_type syntax element refers to the type of data a NAL unit carries, which can be, for example, one of certain slice types, parameter set types, Supplementary Enhancement Information (SEI) message, and so on. The H.265 NAL unit header further comprises nuh_layer_id and nub_temporal_id_plus1, which indicate the spatial/SNR and temporal layer of a coded picture the NAL unit belongs to.

It can be observed that the NAL unit header includes only easily parseable fixed length codewords, that do not have any parsing dependency to other data in the bitstream such as, for example, other NAL unit headers, parameter sets, and so on. As NAL unit headers are the first octets in a NAL unit, MANEs can easily extract them, parse them, and act on them. Other high level syntax elements, for example slice or tile headers, in contrast, are less easily accessible to MANEs as they may require keeping parameter set context and/or the processing of variable length or arithmetically coded codepoints.

It can further be observed that the NAL unit headers as shown in FIGS. 5A-B do not include information that can associate a NAL unit to a segment of the coded picture, such as a slice, tile, or similar part of the bitstream representing a spatial area of the coded picture. In elated art, such information is present in the slice header, in certain cases in the form of a macroblock or CU address. That address, in some cases, is an integer number n indicating that a segment, slice, tile, starts at the n-th macroblock/CU in scan order when counting from the top-left of the picture. Accordingly, n can be dependent on both picture- and macroblock/CU size, and can be small (such as: fitting into 8 bits in binary code) for small picture sizes or large (such as: 32400, requiring 16 bits in binary code); in both cases a macroblock/CU size of 16×16 samples is assumed.

Previously, picture segments such as tiles or slices were used mostly to facilitate bitstream partitioning to match Maximum Transfer Unit size constraints, and parallelization. In both cases, an identification of a tile or slice in a Media-Aware Network Element (MANE), Selective Forwarding Unit (SFU) or similar devices was normally not required, Decoders can obtain the relevant information from the comparatively complex slice header and/or similar information, in conjunction with state obtained from the decoding of parameter sets.

However, more recently, picture segments and especially tiles (and tile groups, which are a collection of tiles in scan order, rectangular order, or any other suitable order) have been used for purposes such as the collecting of CUs representing certain views in composed 360 projections, among other applications. In some of those applications, MANEs and SFUs can advantageously remove certain tiles or other segments from a coded picture when not required for an application. For example, when a cube projection is in use, rendering the scene from an outside viewpoint requires at most three of the six cube surfaces. Transmitting to an endpoint the CUs and segments representing the remaining minimum three surfaces can be a waste of resources. However, in scenarios where a sender may send a full representation (including all six surfaces of a cube projection) to a MANE, and the MANE forwards only the required subset to potentially multiple receivers, and where that required subset may differ from receiver to receiver, the MANE would tailor potentially different bitstreams containing potentially different cube surfaces for each receiver. Doing so, at present, requires the MANE to handle a complex variable length coded slice header as well as keeping state in the form of parameter sets and the like, as required to decode the slice header.

In view of the above, prior video coding syntax lack easily identifiable and parseable syntax elements identifying a tile group or other picture segment in high level syntax structures.

SUMMARY

Some embodiments of the present disclosure address the aforementioned problems and other problems.

In some embodiments, a method performed by at least one processor is provided. The method comprises receiving a coded video stream comprising a picture partitioned into a plurality of tile groups, each of the plurality of tile groups include at least one tile, the coded video stream further comprising a first indicator that indicates whether a tile group of the plurality of tile groups has a rectangular shape; identifying whether the tile group of the picture has the rectangular shape based on the first indicator; and reconstructing, forwarding, or discarding the tile group.

In an embodiment, the first indicator is a flag. In an embodiment, the flag is provided in a parameter set of the coded video stream. In an embodiment, the parameter set is a picture parameter set ("PPS").

In an embodiment, the first indicator of the coded video stream received indicates whether the tile group of the plurality of tile groups has the rectangular shape, without indicating whether any other tile group of the plurality of tile groups of the picture has the rectangular shape.

In an embodiment, the first indicator of the coded video stream received indicates that the tile group has the rectangular shape, the coded video stream further comprises syntax elements that each indicate a respective corner of the tile group, and the method further comprising identifying a size or location of the tile group based on the syntax elements. In an embodiment, the syntax elements are provided in a parameter set of the coded video stream. In an embodiment, the parameter set is a picture parameter set ("PPS").

In an embodiment, the coded video stream received further comprises syntax elements, each of the syntax elements indicating a tile group identification (ID) of a respective tile group of the plurality of tile groups.

In an embodiment, the coded video stream received further comprises a second indicator, in a parameter set or a tile group header, that indicates a number of tiles included in the tile group, and the method further comprises identifying positions of corners of the tile group in the picture based on counting the number of tiles in a raster-scan order.

In an embodiment, the coded video stream received further comprises a second indicator that indicates whether the tile group is a motion-constraint tile set or the tile group includes a plurality of motion-constraint tiles, and the method further comprises identifying whether the tile group of the coded video stream is the motion-constraint tile set or includes the plurality of motion-constraint tiles based on the second indicator.

In some embodiments, a system is provided. The system being for decoding a coded video stream that includes a picture partitioned into a plurality of tile groups, each of the plurality of tile groups include at least one tile. The system comprises memory configured to store computer program code; and at least one processor configured to receive the coded video stream, access the computer program code, and operate as instructed by the computer program code, the computer program code including: first identifying code configured to cause the at least one processor to identify whether a tile group of the plurality of tile groups has a rectangular shape based on a first indicator included in the video stream that indicates whether the tile group of the plurality of tile groups has the rectangular shape; and performing code configured to cause the at least one processor to reconstruct, forward, or discard the tile group.

In an embodiment, the first indicator is a flag. In an embodiment, the flag is provided in a parameter set of the coded video stream.

In an embodiment, the first indicator of the coded video stream indicates whether the tile group of the plurality of tile groups has the rectangular shape, without indicating whether any other tile group of the plurality of tile groups of the picture has the rectangular shape.

In an embodiment, the computer program code further includes second identifying code configured to cause the at least one processor to identify a size or location of the tile group based on syntax elements received in the coded video stream, each of the syntax elements indicating a respective corner of the tile group.

In an embodiment, the computer program code further includes second identifying code configured to cause the at least one processor to identify the tile group of the plurality of tile groups based on a syntax element included in the video stream that indicates a tile group identification (ID) of the tile group.

In an embodiment, the computer program code further includes second identifying code configured to cause the at least one processor to identify positions of corners of the tile group in the picture based on a second indicator included in the coded video stream that indicates a number of tiles included in the tile group, and further based on counting the number of tiles included in the tile group in a raster-scan order.

In an embodiment, the computer program code further includes second identifying code configured to cause the at least one processor to identify whether the tile group of the coded video stream is a motion-constraint tile set or includes a plurality of motion-constraint tiles, based on a second indicator included in the coded video stream that indicates whether the coded video stream is the motion-constraint tile set or includes the plurality of motion-constraint tiles.

In some embodiments, a non-transitory computer-readable medium storing computer instructions is provided. The computer instructions that, when executed by at least one processor, cause the at least one processor to identify, after receiving a coded video stream that includes a picture partitioned into a plurality of tile groups, each of the plurality of tile groups include at least one tile, whether a tile group of the plurality of tile groups has a rectangular shape based on a first indicator included in the video stream that indicates whether the tile group of the plurality of tile groups has the rectangular shape, and reconstruct, forward, or discard the tile group.

BRIEF DESCRIPTION OF THE DRAWINGS

Further features, the nature, and various advantages of the disclosed subject matter will be more apparent from the following detailed description and the accompanying drawings in which:

FIG. 5A is a schematic illustration of a NAL Unit Header in accordance with H.264.

FIG. 5B is a schematic illustration of a NAL Unit Header in accordance with H.265.

FIG. 7 illustrates an example picture that includes tile groups and tiles in accordance with an embodiment.

FIG. 12 is a diagram of a computer system suitable for implementing embodiments.

DETAILED DESCRIPTION

Figure 1:
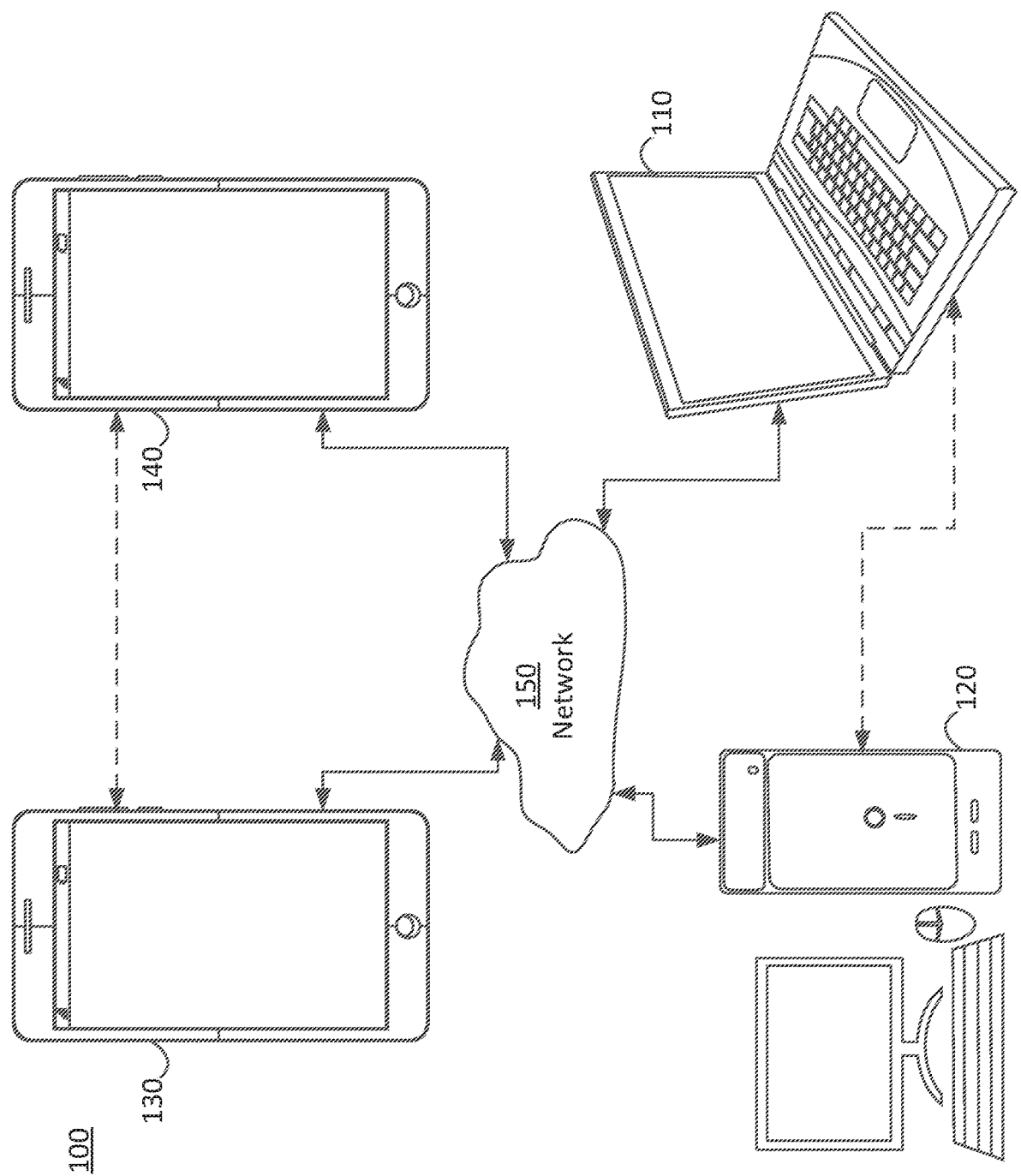
FIG. 1 is a schematic illustration of a simplified block diagram of a communication system in accordance with an embodiment.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminal. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
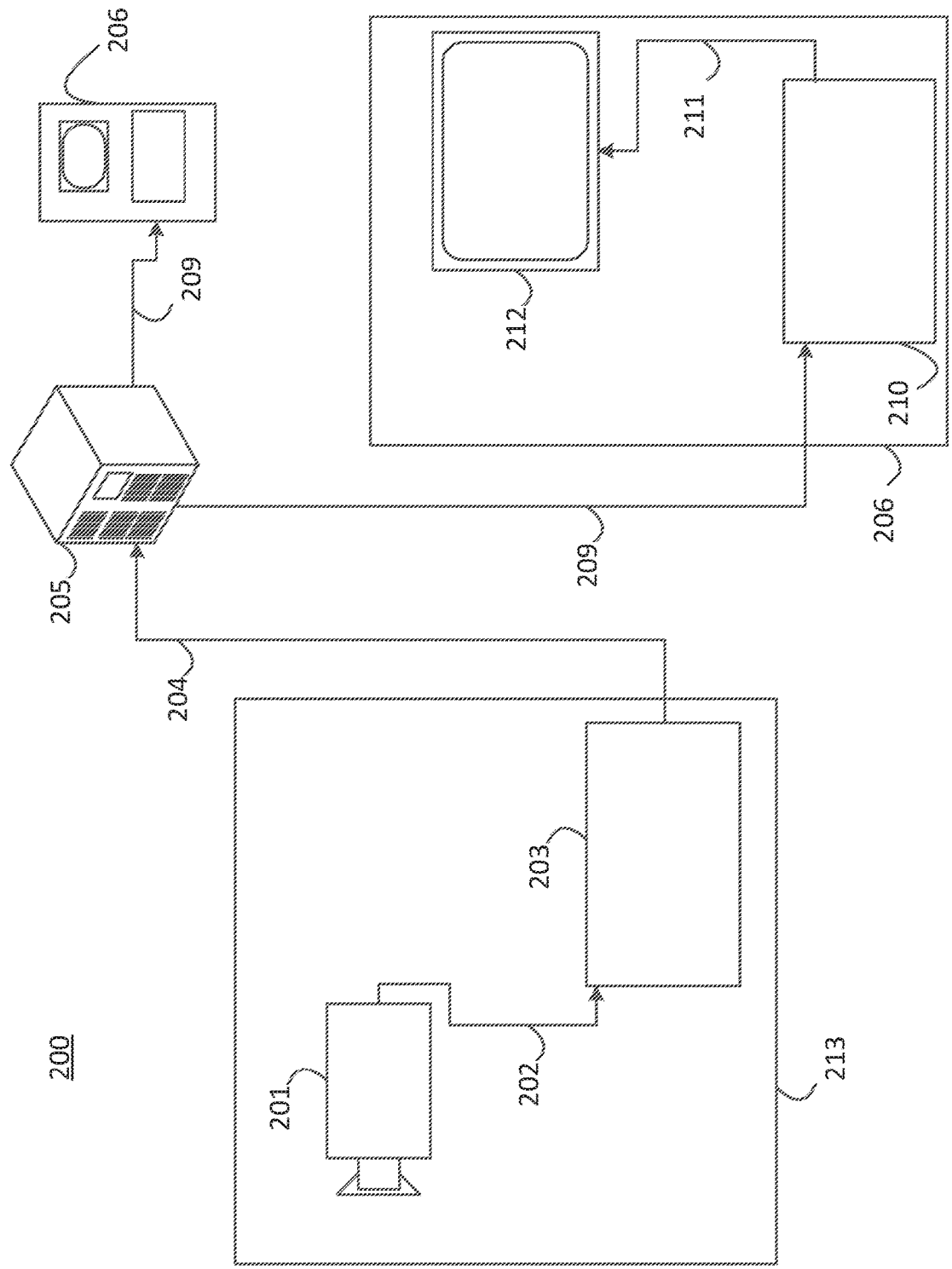
FIG. 2 is a schematic illustration of a simplified block diagram of a streaming system in accordance with an embodiment.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, an uncompressed video sample stream 202. The video source 201 may be, for example, a digital camera. The sample stream 202, depicted as a bold line to emphasize a high data volume when compared to encoded video bitstreams, can be processed by the encoder 203 coupled to the camera 201. The encoder 203 can include hardware, software, or a combination thereof to enable or implement aspects of the disclosed subject matter as described in more detail below. The encoder 203 may also generate an encoded video bitstream 204. The encoded video bitstream 204, depicted as a thin line to emphasize a lower data volume when compared to the uncompressed video sample stream 202, can be stored on a streaming server 205 for future use. One or more streaming clients 206 can access the streaming server 205 to retrieve video bit streams 209 that may be copies of the encoded video bitstream 204.

In embodiments, the streaming server 205 may also function as a Media-Aware Network Element (MANE) For example, the streaming server 205 may be configured to prune the encoded video bitstream 204 for tailoring potentially different bitstreams to one or more of the streaming clients 206. In embodiments, a MANE may be separately provided from the streaming server 205 in the streaming system 200

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
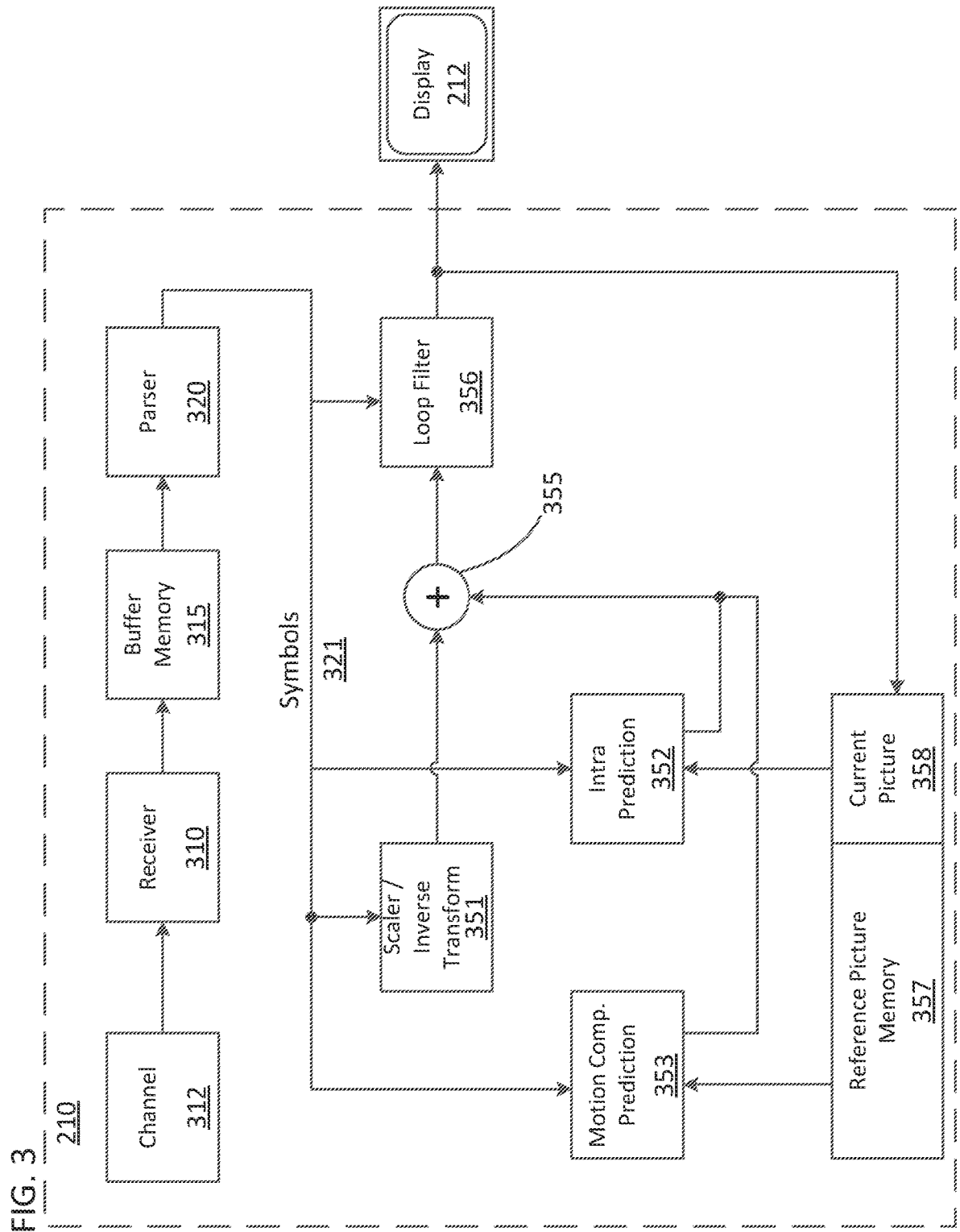
FIG. 3 is a schematic illustration of a simplified block diagram of a video decoder and a display in accordance with an embodiment.

FIG. 3 illustrates an example functional block diagram of a video decoder 210 that is attached to a display 212 according to an embodiment of the present disclosure.

The video decoder 210 may include a channel 312, receiver 310, a buffer memory 315, an entropy decoder/parser 320, a scaler/inverse transform unit 351, an intra prediction unit 352, a Motion Compensation Prediction unit 353, an aggregator 355, a loop filter unit 356, reference picture memory 357, and current picture memory 358. In at least one embodiment, the video decoder 210 may include an integrated circuit, a series of integrated circuits, and/or other electronic circuitry. The video decoder 210 may also be partially or entirely embodied in software running on one or more CPUs with associated memories.

In this embodiment, and other embodiments, the receiver 310 may receive one or more coded video sequences to be decoded by the decoder 210 one coded video sequence at a time, where the decoding of each coded video sequence is independent from other coded video sequences. The coded video sequence may be received from the channel 312, which may be a hardware/software link to a storage device which stores the encoded video data. The receiver 310 may receive the encoded video data with other data, for example, coded audio data and/or ancillary data streams, that may be forwarded to their respective using entities (not depicted). The receiver 310 may separate the coded video sequence from the other data. To combat network jitter, the buffer memory 315 may be coupled in between the receiver 310 and the entropy decoder/parser 320 ("parser" henceforth). When the receiver 310 is receiving data from a store/forward device of sufficient bandwidth and controllability, or from an isosynchronous network, the buffer 315 may not be used, or can be small. For use on best effort packet networks such as the Internet, the buffer 315 may be required, can be comparatively large, and can be of adaptive size.

The video decoder 210 may include the parser 320 to reconstruct symbols 321 from the entropy coded video sequence. Categories of those symbols include, for example, information used to manage operation of the decoder 210, and potentially information to control a rendering device such as a display 212 that may be coupled to a decoder as illustrated in FIG. 2. The control information for the rendering device(s) may be in the form of, for example, Supplementary Enhancement Information (SET) messages or Video Usability Information (VUI) parameter set fragments (not depicted). The parser 320 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 320 may extract from the coded video sequence a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 320 may also extract from the coded video sequence information such as transform coefficients, quantizer parameter values, motion vectors, and so forth.

The parser 320 may perform entropy decoding/parsing operation on the video sequence received from the buffer 315, so to create symbols 321.

Reconstruction of the symbols 321 can involve multiple different units depending on the type of the coded video picture or parts thereof (such as: inter and intra picture, inter and intra block), and other factors. Which units are involved, and how they are invoiced, can be controlled by the subgroup control information that was parsed from the coded video sequence by the parser 320. The flow of such subgroup control information between the parser 320 and the multiple units described below is not depicted for clarity.

Beyond the functional blocks already mentioned, the decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit 351. The scaler/inverse transform unit 351 may receive quantized transform coefficient as well as control information, including which transform to use, block size, quantization factor, quantization scaling matrices, etc. as symbol(s) 321 from the parser 320. The scaler/inverse transform unit 351 can output blocks comprising sample values that can be input into the aggregator 355.

In some cases, the output samples of the scaler/inverse transform 351 can pertain to an intra coded block; that is: a block that is not using predictive information from previously reconstructed pictures, but can use predictive information from previously reconstructed parts of the current picture. Such predictive information can be provided by the intra picture prediction unit 352. In some cases, the intra picture prediction unit 352 generates a block of the same size and shape of the block under reconstruction, using surrounding already reconstructed information fetched from the current (partly reconstructed) picture from the current picture memory 358. The aggregator 355, in some cases, adds, on a per sample basis, the prediction information the intra prediction unit 352 has generated to the output sample information as provided by the scaler/inverse transform unit 351.

In other cases, the output samples of the scaler/inverse transform unit 351 can pertain to an inter coded, and potentially motion compensated block. In such a case, a Motion Compensation Prediction unit 353 can access the reference picture memory 357 to fetch samples used for prediction. After motion compensating the fetched samples in accordance with the symbols 321 pertaining to the block, these samples can be added by the aggregator 355 to the output of the scaler/inverse transform unit 351 (in this case called the residual samples or residual signal) so to generate output sample information. The addresses within the reference picture memory 357, from where the Motion Compensation Prediction unit 353 fetches prediction samples, can be controlled by motion vectors. The motion vectors may be available to the Motion Compensation Prediction unit 353 in the form of symbols 321 that can have, for example x, Y, and reference picture components. Motion compensation also can include interpolation of sample values as fetched from the reference picture memory 357 when sub-sample exact motion vectors are in use, motion vector prediction mechanisms, and so forth.

The output samples of the aggregator 355 can be subject to various loop filtering techniques in the loop filter unit 356. Video compression technologies can include in-loop filter technologies that are controlled by parameters included in the coded video bitstream and made available to the loop filter unit 356 as symbols 321 from the parser 320, but can also be responsive to meta-information obtained during the decoding of previous (in decoding order) parts of the coded picture or coded video sequence, as well as responsive to previously reconstructed and loop-filtered sample values.

The output of the loop filter unit 356 can be a sample stream that can be output to a render device such as a display 212, as well as stored in the reference picture memory 357 for use in future inter-picture prediction.

Certain coded pictures, once fully reconstructed, can be used as reference pictures for future prediction. Once a coded picture is fully reconstructed and the coded picture has been identified as a reference picture (by, for example, parser 320), the current reference picture stored in the current picture memory 358 can become part of the reference picture memory 357, and a fresh current picture memory can be reallocated before commencing the reconstruction of the following coded picture.

The video decoder 210 may perform decoding operations according to a predetermined video compression technology that may be documented in a standard, such as ITU-T Rec. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 310 may receive additional (redundant) data with the encoded video. The additional data may be included as part of the coded video sequence(s). The additional data may be used by the video decoder 210 to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
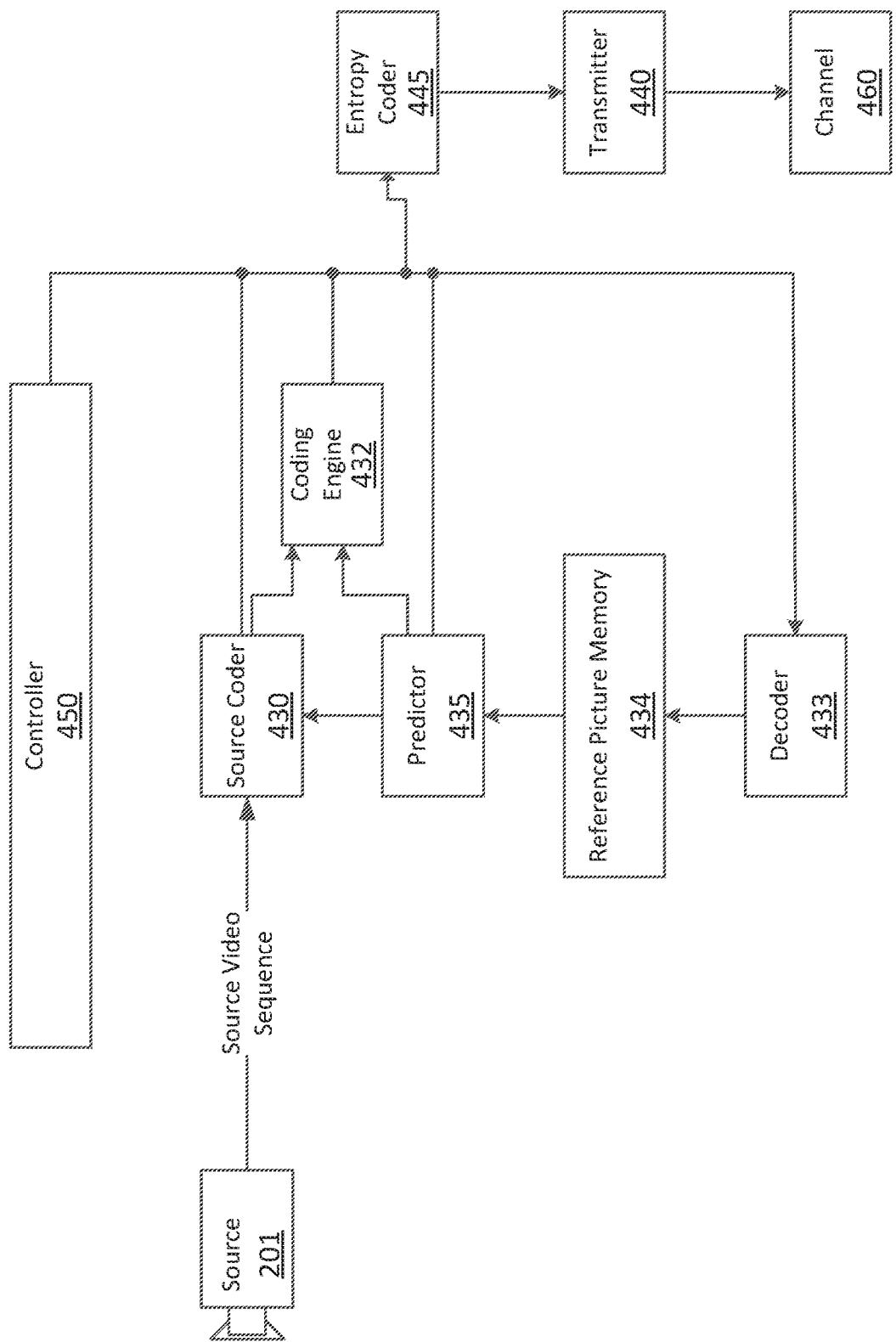
FIG. 4 is a schematic illustration of a simplified block diagram of a video encoder and a video source in accordance with an embodiment.

FIG. 4 illustrates an example functional block diagram of a video encoder 203 associated with a video source 201 according to an embodiment of the present disclosure.

The video encoder 203 may include, for example, an encoder that is a source coder 430, a coding engine 432, a (local) decoder 433, a reference picture memory 434, a predictor 435, a transmitter 440, an entropy coder 445, a controller 450, and a channel 460.

The encoder 203 may receive video samples from a video source 201 (that is not part of the encoder) that may capture video image(s) to be coded by the encoder 203.

The video source 201 may provide the source video sequence to be coded by the encoder 203 in the form of a digital video sample stream that can be of any suitable bit depth (for example: x bit, 10 bit, 12 bit, . . . , any colorspace (for example, BT.601 Y CrCB, RGB, . . . ) and any suitable sampling structure (for example Y CrCb 4:2:0, Y CrCb 4:4:4). In a media serving system, the video source 201 may be a storage device storing previously prepared video. In a videoconferencing system, the video source 203 may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder 203 may code and compress the pictures of the source video sequence into a coded video sequence 443 in real time or under any other time constraints as required by the application. Enforcing appropriate coding speed may be one function of the controller 450. The controller 450 may also control other functional units as described below and may be functionally coupled to these units. The coupling is not depicted for clarity. Parameters set by the controller 450 can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 450 as they may pertain to video encoder (203) optimized for a certain system design.

Some video encoders operate in what a person skilled in the are readily recognizes as a "coding loop". As a simplified description, a coding loop can consist of the encoding part of the source coder 430 (responsible for creating symbols based on an input picture to be coded, and a reference picture(s)), and the (local) decoder 433 embedded in the encoder 203 that reconstructs the symbols to create the sample data that a (remote) decoder also would create, when a compression between symbols and coded video bitstream is lossless in certain video compression technologies. That reconstructed sample stream may be input to the reference picture memory 434. As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder 433 can be substantially the same as of a "remote" decoder 210, which has already been described in detail above in conjunction with FIG. 3. However, as symbols are available and en/decoding of symbols to a coded video sequence by the entropy coder 445 and the parser 320 can be lossless, the entropy decoding parts of decoder 210, including channel 312, receiver 310, buffer 315, and parser 320 may not be fully implemented in the local decoder 433.

An observation that can be made at this point is that any decoder technology, except the parsing/entropy decoding that is present in a decoder, may need to be present in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder 430 may perform motion compensated predictive coding, which codes an input frame predictively with reference to one or more previously-coded frames from the video sequence that were designated as "reference frames." In this manner, the coding engine 432 codes differences between pixel blocks of an input frame and pixel blocks of reference frame(s) that may be selected as prediction reference(s) to the input frame.

The local video decoder 433 may decode coded video data of frames that may be designated as reference frames, based on symbols created by the source coder 430. Operations of the coding engine 432 may advantageously be lossy processes. When the coded video data is decoded at a video decode (not shown in FIG. 4), the reconstructed video sequence typically may be a replica of the source video sequence with some errors. The local video decoder 433 replicates decoding processes that may be performed by the video decoder on reference frames and may cause reconstructed reference frames to be stored in the reference picture memory 434. In this manner, the encoder 203 may store copies of reconstructed reference frames locally that have common content as the reconstructed reference frames that will be obtained by a far-end video decoder (absent transmission errors).

The predictor 435 may perform prediction searches for the coding engine 432. That is, for a new frame to be coded, the predictor 435 may search the reference picture memory 434 for sample data (as candidate reference pixel blocks) or certain metadata such as reference picture motion vectors, block shapes, and so on, that may serve as an appropriate prediction reference for the new pictures. The predictor 435 may operate on a sample block-by-pixel block basis to find appropriate prediction references. In some cases, as determined by search results obtained by the predictor 435, an input picture may have prediction references drawn from multiple reference pictures stored in the reference picture memory 434.

The controller 450 may manage coding operations of the video coder 430, including, for example, setting of parameters and subgroup parameters used for encoding the video data.

Output of all aforementioned functional units may be subjected to entropy coding in the entropy coder 445. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 440 may buffer the coded video sequence (s) as created by the entropy coder 445 to prepare it for transmission via a communication channel 460, which may be a hardware/software link to a storage device which would store the encoded video data. The transmitter 440 may merge coded video data from the video coder 430 with other data to be transmitted, for example, coded audio data and/or ancillary data streams (sources not shown).

The controller 450 may manage operation of the encoder 203. During coding, the controller 450 may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive Picture (P picture) may be one that may be coded and decoded using intra prediction or inter prediction using at most one motion vector and reference index to predict the sample values of each block.

A Bi-directionally Predictive Picture (B Picture) one that may be coded and decoded using intra prediction or prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one previously coded reference pictures.

The video coder 203 may perform coding operations according to a predetermined video coding technology or standard, such as ITU-T Rec. H.265. In its operation, the video coder 203 may perform various compression operations, including predictive coding operations that exploit temporal and spatial redundancies in the input video sequence. The coded video data, therefore, may conform to a syntax specified by the video coding technology or standard being used.

In an embodiment, the transmitter 440 may transmit additional data with the encoded video. The video coder 430 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

According to embodiments of the present disclosure, information identifying a picture segment such as, for example, a tile, tile group, slice, Group Of Blocks (GOB), and so forth ("tile" henceforth) may be placed in an easily accessible high level syntax structure such as the NAL Unit Header or similar structure comprising fixed length codewords and designed for easy processing by MANES ("NUH" henceforth).

In embodiments, the information identifying a tile can take different forms. In designing this information, a few design considerations may be kept in mind, Some of these design considerations are listed below.

With respect to a first design consideration, the possible number of tiles in a given picture can be small when compared to, for example the possible number of slices in legacy video coding technologies or standards. For example, in H.264, it is possible (for certain picture sizes) to have slices covering a single macroblock, allowing for as many slices as there are macroblocks. In contrast, when representing a tiled cube map, six tiles may suffice, independent of the resolution of the picture. In many practical cases, a maximum number of tiles of 64, 128, or 256 can safely be assumed.

With respect to a second design consideration, the tile layout can be fixed and, while the video coding technology itself may allow flexibility of the tile layout from picture to picture, system standards or technologies can restrict that flexibility to the point where a tile layout remains the same throughout a session. Accordingly, in some embodiments of the present disclosure, the tile layout can be allowed to be made available to a MANE through non-video bitstream specific means, such as during the session setup. An undesirable context dependency between parameter sets in the video coding and MANE operation can thereby be prohibited.

Embodiments of the present disclosure may implement the first and second design considerations described above. With respect to embodiments of the present disclosure that implement the first and second design considerations, the mechanism to identify a tile carried by NAL unit, so to allow the NAL unit to be removed by a MANE, can be significantly simplified when compared to related art, such as H.264 and H.265.

For example, in H.264 and H.265, a MANE would have to identify the correct sequence parameter set to learn about the length of the slice/tile address codeword in the slice header. Such length information is coded as a variable length codeword in the sequence parameter set; therefore, as a minimum, a MANE would need to follow the activation sequence of parameter sets to identify the currently active sequence parameter set, and (possibly not in this order, as parameter sets are parsing-independent) decode variable length codewords to identify the length of the binary coded slice/tile address in the carried in the slice header. Then, the MANE would need to decode variable length codeword(s) in the slice header in order to obtain the starting macroblock/CU address. That information can be matched against the tile layout as decoded from the parameter sets to identify the tile.

In some embodiments of the present disclosure, the identification information for the tile can be the address of the first macroblock/CU of the tile. In effect, such a mechanism would move the starting address from the slice header to the NUH. While doing so can be a minimum change approach to the codec design, it may grow the NUH significantly. However, the increase of the size of the NUH may be tolerable even from a coding efficiency viewpoint, because the same amount of bits may be removed from the slice/tile headers.

As described above, a macroblock/CU address can be reasonably small for small picture sizes and large macrolock/CU sizes, or quite large for small CU sizes and large picture sizes. For this reason, H.265's SPS contains an indication of the length of the macroblock/CU address as carried in the slice header.

In embodiments of the present disclosure, the mechanism for indicating length of the macroblock/CU address can be retained for the NAL unit header. However, doing so can have two disadvantages. First, the context dependency established by determining the size of a syntax element in the NAL unit header through a parameter set value may require a MANE to keep track of parameter set activation, which can be tedious. Second, NAL unit headers are, at least until now, octet aligned to simplify processing in MANEs. Maintaining that octet alignment may require padding, thereby wasting bits, in such cases where the size of the macroblock/CU address as signaled by the parameter set, in conjunction with the remaining NAL unit header syntax elements, do not add up to a number in bits divisible by 8.

In embodiments of the present disclosure (including the above described embodiments), the size of the macroblock/CU address, or any other syntax element in the NAL unit header, can be determined by other fields in the NAL unit header. This mechanism advantageously avoids the context dependency between parameter sets and NAL unit headers. One potential disadvantage is the use of bits, or codepoints, in other fields of the NAL unit header.

However, when not considering slices in the traditional sense, but only tiles or tile groups or similar allocation mechanisms of CUs to bitstream entities, more advanced options can be implemented in embodiments of the present disclosure, as described further below.

In order to describe some of these embodiments, the terms "slice" and "tile" shall briefly be reviewed.

A slice may be a collection of CUs or macroblocks, normally in scan order, and identified by two factors: the starting macroblock/CU address, which may be coded in the slice header, and the end of the slice, which may be identified by the start of a new slice (which, in turn may be indicated through the presence of the next slice header). While certain video compression technologies and standards impose certain relatively minor restrictions on the number and layout of slices, in most cases, the slice layout can change from coded picture to coded picture and is often determined by mechanisms such as rate control and MTU size matching.

Tiles, on the other hand, refer to a typically rectangular arrangement of CUs, and the size and shape of the rectangle (and other rectangles, that together make up the picture) is coded in a parameter set. In other words, a tile layout may be somewhat static in that a change from one tile layout to another may require the activation of a different parameter set. Further, the number of tiles can advantageously be restricted so to enable efficient hardware implementations. The result can be that, in many video compression technologies and standards, a relatively short fixed length binary codeword of, for example, 8 bits, allows for addressing the maximum number of tiles for all picture sizes in practical use. Accordingly, a fixed length codeword for a tile ID can be used to identify a tile in a NAL unit header, thereby avoiding a parsing and context dependency between the tile-identifying NAL unit header codeword and parameter sets. Alternatively, the mechanisms supporting a variable length codeword for macroblock/CU addresses in the NAL unit header can, if so desired, be equally applied to a tile ID codeword, at the expense of similar architectural shortcomings.

Referring to FIGS. 6A-D, example NAL unit header designs of embodiments of the present disclosure are illustrated.

Figure 6A:
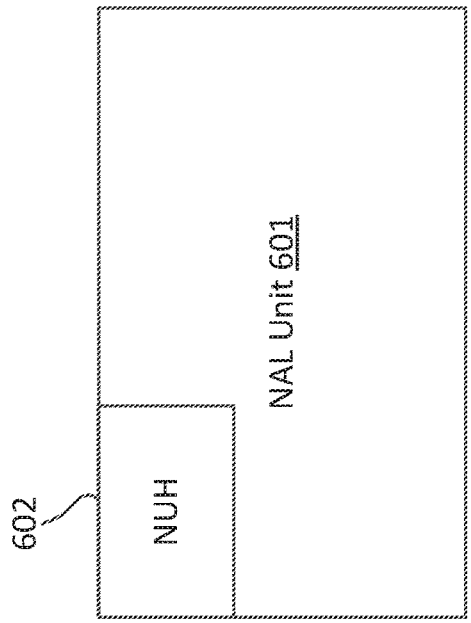
FIG. 6A is a schematic illustration of a NAL unit of an embodiment.

As illustrated in FIG. 6A, an NAL unit 601 may be provided that is a part of a coded video bitstream. The coded video bitstream may include a plurality of the NAL units 601. In some cases, the NAL unit 601 may be octet aligned and smaller or equal to a common Maximum Transfer Unit (MTU) size of a data network. One such common MTU size is 1500 octets, which stems from certain limitations of early Ethernet technologies. The NAL unit 601 may include a NAL unit header 602 at the beginning of the NAL unit 601. The framing of NAL units, including NAL unit(s) 601, inside a coded video bitstream can be through start codes, through alignment with packet structures of underlying packet oriented transport networks, and so forth.

Figure 6B:
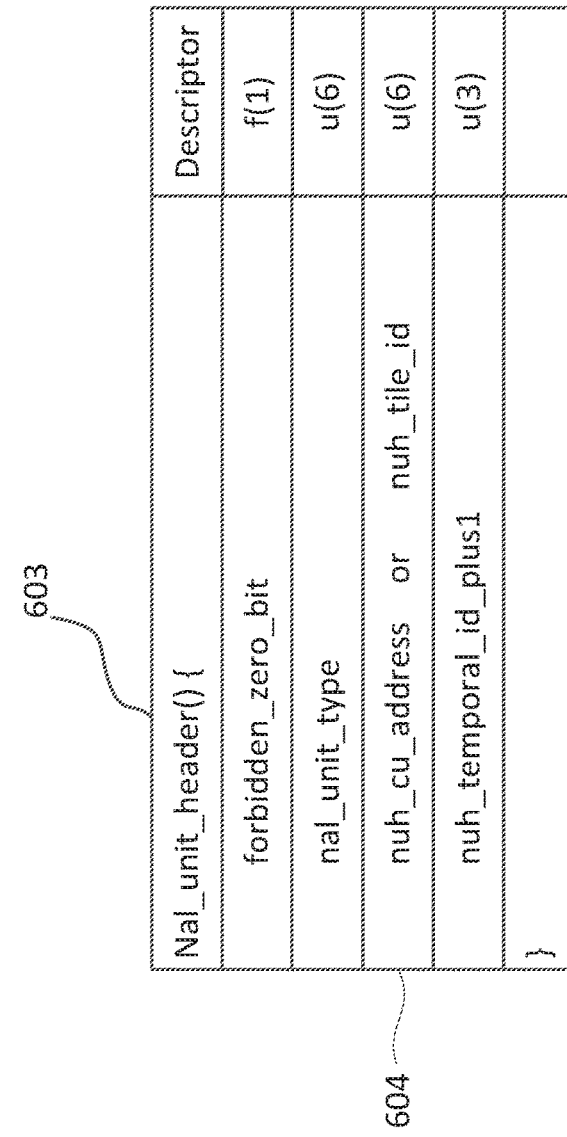
FIG. 6B is a schematic illustration of a NAL unit header of an embodiment.

With reference to FIG. 6B, a syntax diagram of an example NAL unit header 603 for the NAL unit 601 of the present disclosure is illustrated, which shares some similarities to the NAL unit header used in H.265 that is illustrated in FIG. 5B. Embodiments of the present disclosure may alternatively or additionally implement NAL unit headers with structures that share some similarities to, for example, the NAL unit header of H.264 or VVC.

In the NAL unit header 603, a syntax element 604 of a CU Address or Tile ID can be included. In embodiments, the length of that syntax element 604 can be fixed, and can be chosen such that the NAL unit header 603 continues to be octet aligned. In embodiments, the syntax element 604 can be in a format easily processable by not only video encoders and decoders, but also by MANES. In embodiments, as a non-limiting example, the syntax element 604 that includes the CU address or a Tile ID may be represented by a 6 bit unsigned integer, as expressed by the Descriptor u(6). In the non-limiting example, the syntax element 604 for the CU Address or Tile ID occupies the same bits that are used, in H.265, for the layer id.

Figure 6C:
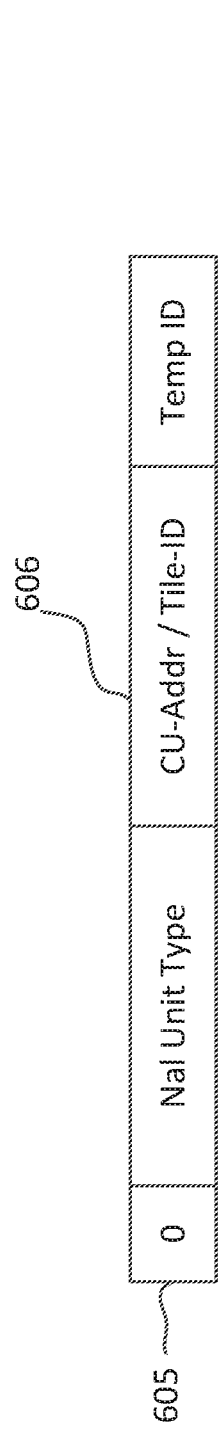
FIG. 6C is a schematic illustration of a NAL unit header of an embodiment.

FIG. 6C illustrates an NAL unit header 605 of the present disclosure that may be implemented with the NAL unit 601. The NAL unit head 605 shares similarities with the NAL unit header 603, but is illustrated in FIG. 6C by a different presentation form. As illustrated in FIG. 6C, the NAL unit header 605 may include a syntax element 606 for the CU address or Tile ID.

Figure 6D:
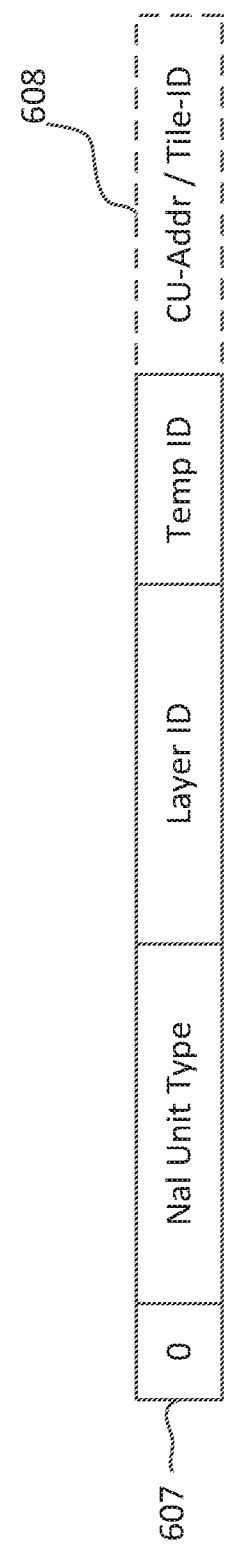
FIG. 6D is a schematic illustration of a NAL unit header of an embodiment.

FIG. 6D illustrates an NM, unit header 607, which preserves fields of the H.265 NAL unit header. In non-limiting example embodiments, a syntax element 608 may be added at, for example, the end of the NAL unit header 607. In non-limiting example embodiments, the syntax element 607 may alternatively be inserted somewhere in the middle of the other syntax elements of the NAL unit header 607. The syntax element 608 can be of fixed or variable size and, when of variable size, its size can be determined by any of the mechanisms described above (e.g., through a parameter set syntax element or through the NAL unit type), or any other appropriate mechanism.

Figure 7:
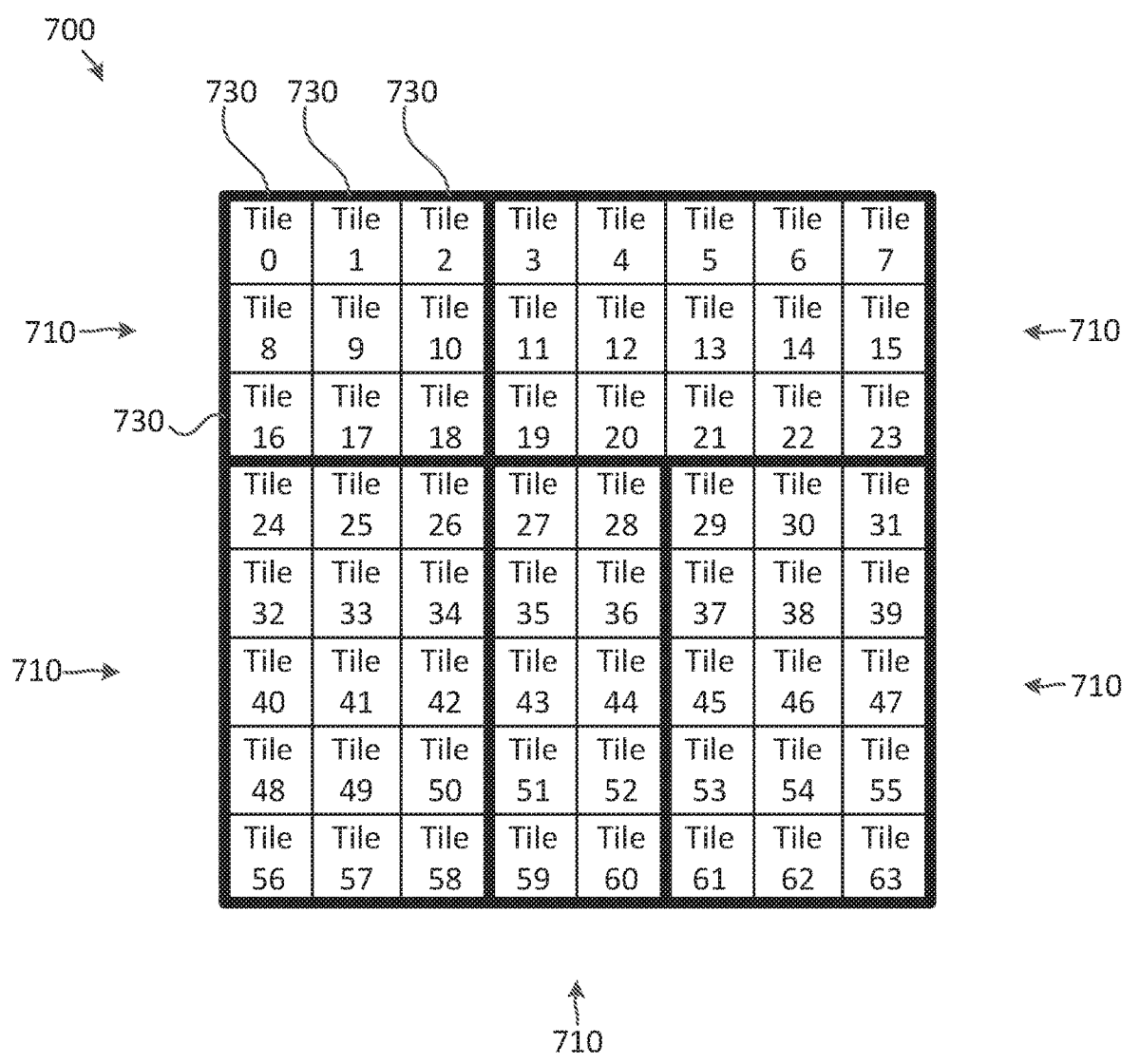

A non-limiting example structure of the tile and tile group partitioning design of embodiments of the present disclosure is described below with reference to FIG. 7. In embodiments, a coded video stream including a plurality of pictures 700 may be sent from encoders to decoders and MANEs of the present disclosure. Each picture 700 may include one or more tiles 730. As illustrated in FIG. 7, as a non-limiting example, the picture 700 is shown to have 64 tiles. The amount, size, and shape of the tiles 730 are not limited by FIG. 7, and can be any amount, size, and shape. For example, the tiles 730 can be rectangular or non rectangular. The tiles 730, together, may be divided into one or more tile groups 710. As illustrated in FIG. 7, as a non-limiting example, the picture 700 is shown to have five tile groups, each tile group 610 including multiple tiles 630. The amount, size, and shape of the tile groups 710 are not limited by FIG. 7, and can be any amount, size, and shape. For example, the tiles 730 can be rectangular or non-rectangular.

Embodiments of the present disclosure may decode and encode a video stream Wherein tile groups 710 and tiles 730 are defined and partitioned.

Figure 8:
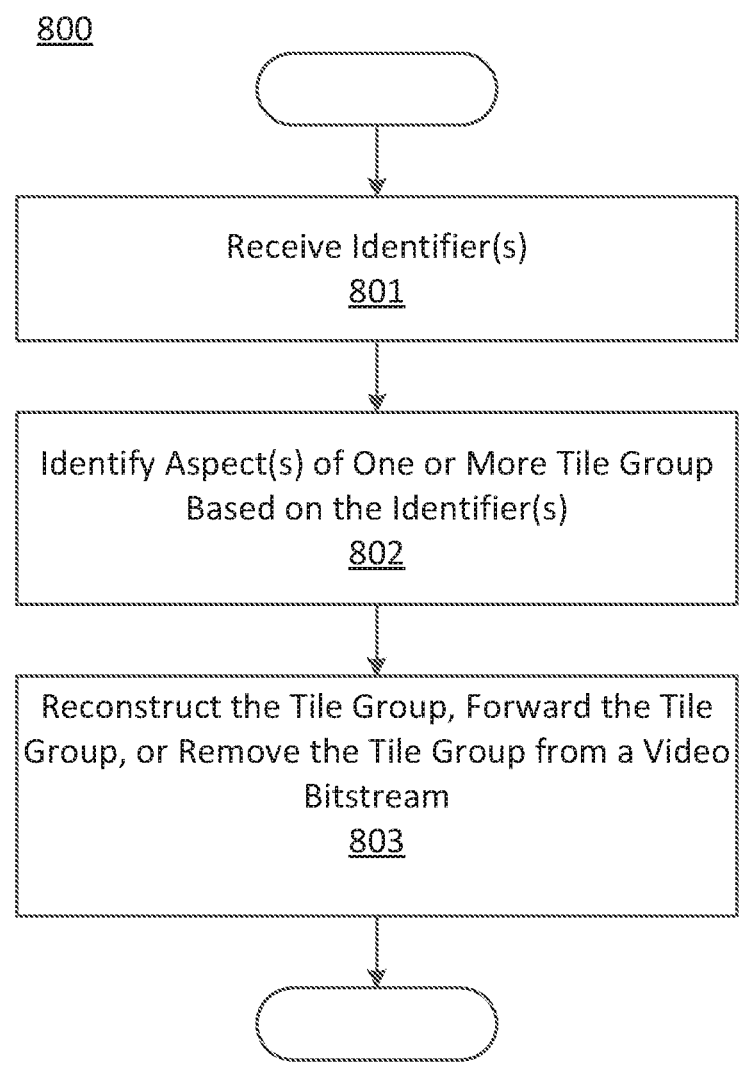
FIG. 8 illustrates a process for decoding in accordance with an embodiment.

For example, with reference to FIG. 8, decoders and MANEs of the present disclosure may perform the process 800 to decode the video stream.

As illustrated in FIG. 8, a decoder or MANE may receive one or more identifiers (801). The one or more identifiers may be provided in the video stream sent to the decoder or the MANE by the encoder, or by alternative means outside the video stream by the encoder or another device. The one or more identifiers may explicitly signal characteristics of the tiles groups 710 and tiles 730 to the decoder or the MANE, and may alternatively or additionally implicitly signal characteristics of the tile groups 710 and tiles 730. The one or more identifiers may be, for example, flags or other elements.

Following receiving the identifier(s), the decoder or MANE may identify one or more characteristics of one or more tile groups 710 and tiles 730, based on the identifiers (802). After characteristics of a tile group 710 is identified, the decoder or the MANE may then use the identified characteristics to reconstruct the tile group 710, forward the tile group 710, or remove the tile group 710 from the video stream, as appropriate. For example, if the process 800 is performed by a decoder, the decoder may reconstruct such tile group 710 and its tiles 730 (e.g. reconstruct the NAL units carrying such tiles 730), or discard such tile group 710 and its tiles 730, as appropriate. If the process 800 is performed by a MANE, the MANE may forward such tile group 710 and its tiles 730, or discard such tile group 710 and its tiles 730, as appropriate.

Figure 9:
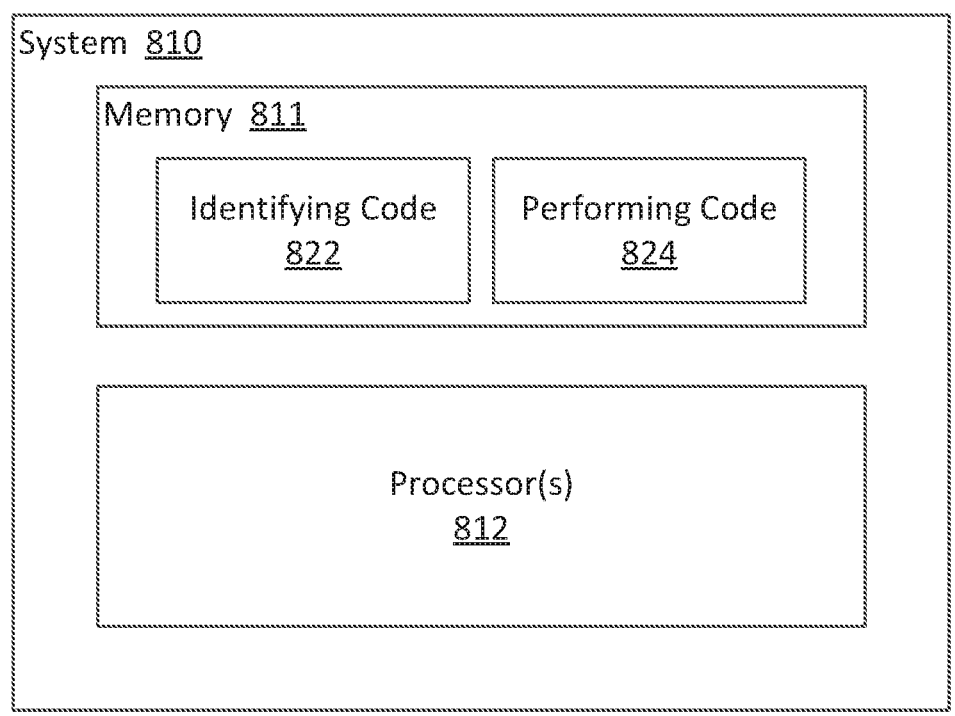
FIG. 9 illustrates a system of an embodiment.

As illustrated in FIG. 9, a system 810 of the present disclosure may include memory 811 storing computer program code and at least one processor 812 configured to receive a coded video stream, access the computer program code, and operate as instructed by the computer program code. The computer program code may include identifying code 822 configured to cause the at least one processor 812 to perform step 802 illustrated in FIG. 8, and may further include performing code 824 configured to cause the at least one processor 812 to perform step 803 illustrated in FIG. 8.

Described below are examples of some of the identifiers that may be received by decoders and MANEs of the present disclosure, and aspects of tile groups 610 and tiles 630 that may be identified based on the identifiers.

In some embodiments, a flag may indicate whether a tile group 710 is a rectangle sub-picture or not. In embodiments, an encoder may send the flag in a coded video stream to a decoder or MANE of the present disclosure, and the decoder or MANE may determine whether tile group 710 is a rectangle sub-picture or not based on the flag. Alternatively, the flag may be sent by other means outside the coded video stream.

Alternatively or additionally, in some embodiments, decoders, MANEs, and encoders of the present disclosure may perform a method of signaling tile group structures that comprises signaling a flag indicating whether a picture 700 includes only a single tile group 710 or multiple tile groups 710. As an example, the flag may be signaled by an encoder to a decoder or MANE. Alternatively, the flag may be sent by other means outside the coded video stream. The flag may be present in a parameter set (e.g. picture parameter set). When the picture 700 includes only a single tile group 710, the tile group 710 may have a rectangular shape. If the picture 700 includes multiple tile groups 710, each tile group 710 may have a rectangular shape or a non-rectangular shape.

Alternatively or additionally, in some embodiments, decoders, MANEs, and encoders of the present disclosure may perform a method of signaling tile group structures that comprises signaling a flag whether each tile group 710 belonging to the current picture 700 may have a rectangular shape or not. If the value of the flag is equal to 1, all tile groups 710 belonging to the current picture 700 may have rectangular shapes. As an example, the flag may be signaled by an encoder to a decoder or MANE. Alternatively, the flag may be sent by other means outside the coded video stream. The flag may be present in a parameter set (e.g. picture parameter set).

Alternatively or additionally, in some embodiments, when a picture includes one or more rectangular tile groups 710, encoders of the present disclosure may provide, to a decoder or MANE, a syntax element indicating a number tile group columns partitioning the picture 700, and a syntax element indicating a number tile group rows partitioning the picture 700. In the case, each rectangular tile group 710 may have a uniform space, the syntax elements may be present in a parameter set (e.g. picture parameter set) sent by the encoder to the decoder or MANE. Alternatively, the syntax elements may be sent by other means, outside the coded video stream, to the decoder or MANE.

Alternatively or additionally, in embodiments, when a picture 700 includes one or more rectangle tile groups 710, encoders of the present disclosure may provide a syntax element to a decoder or MANE indicating a number of tile groups 710 in the picture 700. Encoders may also provide, to decoders or MANEs, a syntax element that indicates an index indicating the left-top corner of a corresponding tile group 710, and a syntax element that indicates an index indicating the right-bottom corner of the corresponding tile group 710. The flag may be present in a parameter set (e.g. picture parameter set) sent by the encoder to the decoder or MANE. Alternatively, the syntax elements may be sent by other means, outside the coded video stream, to the decoder or MANE.

Alternatively or additionally, in embodiments, a tile group ID may be signaled for each tile group 710. The tile group ID may be used to identify each tile group 710. A flag may indicate whether explicit signaling tile group ID is present or not in a parameter set (e.g. picture parameter set). The parameter set may be sent by an encoder to a decoder or MANE. If the flag indicates that tile group IDs are explicitly signaled, a length of tile group ID may also be signaled. For each tile group 710, a specific tile group ID may be assigned. In the same picture 700, each tile group ID may not have the same value. In embodiments, the flag, the tile group ID, and the length of tile group ID may be signaled by encoders to decoders or MANEs of the present disclosure.

Alternatively or additionally, in embodiments, two different tile groups 710 may share one or more of the tiles 730. A flag in a parameter set may be provided, which may indicate whether two different tile groups 710 can be overlapped and have the same tile 730 or not. If the flag indicates that overlapping is allowed, the same tile 710 may be present in one or more of the tile groups 730. In embodiments, the parameter set, including the flag, may be sent by encoders to decoders or MANEs of the present disclosure.

Alternatively or additionally, in embodiments, when a picture 700 may include multiple rectangle or non-rectangle tile groups 710, the number of tiles 730 may be signaled for each tile group 710 in a parameter set or in a tile group header. Then, the left-top and right-bottom positions of each tile group 710 may be inferred by counting the number for tiles in raster-scan order. In embodiments, the parameter set and tile group headers, and the signals therein, may be sent by encoders to decoders or MANEs of the present disclosure, and the decoders or MANEs may perform the inferences.

Alternatively or additionally, in embodiments, each tile group 710 may be a motion-constraint tile set or each tile group 710 may contain multiple motion-constraint tiles. A flag may indicate whether a tile group 710 has a motion-constraint tile set or multiple motion-constraint tiles. In embodiments, the flag may be sent by encoders to decoders or MANEs of the present disclosure, and the decoders or MANEs may determine whether the tile group 710 has a motion-constraint tile set or multiple motion-constraint tiles based on the flag. Alternatively, the flag may be sent by other means, outside the coded video stream, to the decoder or MANE.

Alternatively or additionally, in embodiments, tiles 730 belonging to tile groups 710 may be in raster scan order. The addresses of the tile groups 710 may be in increasing order. Thus, the index of the left-top of the (n+1)-th tile group 710 may be greater than the index of the left-top of the n-th tile group 710. In embodiments, the addresses of the tile groups 610 may be sent by encoders to decoders or MANEs of the present disclosure. Alternatively, the addresses may be sent by other means, outside the coded video stream, to the decoder or MANE.

Alternatively or additionally, in embodiments, the shapes of the tile groups 710 in a picture 700 may be set by an encoder and determined by a decoder so that each tile 730 has the entire left boundary and top boundary consisting of a picture boundary or previously decoded tiles 730, when the tile group 710 is decoded by a decoder.

In embodiments, an encoder can write NAL unit headers (or tile group headers) to include a syntax element covering a tile group ID in a manner similar to writing existing NAL unit header (or tile group header) syntax, which is understood by a person skilled in the art.

In embodiments, a decoder or MANE can parse, from a coded video bitstream, a NAL unit header—more precisely—the syntax elements that make up the NAL unit header (or tile group header)—in a manner understood by a person skilled in the art, irrespective of the presence or absence of a syntax element carrying tile group ID or other forms of tile-identifying information. It should be noted, however, that the syntax element, in some cases as described above, is coded without requiring state information and in an accessible entropy coded format, for example a fixed length, binary code.

In accordance with some embodiments of the present disclosure, a decoder or MANE can, nevertheless, identify a tile group 710 in a coded picture 700 with little effort when compared to the operations required absent the disclosed subject matter.

Figure 10:
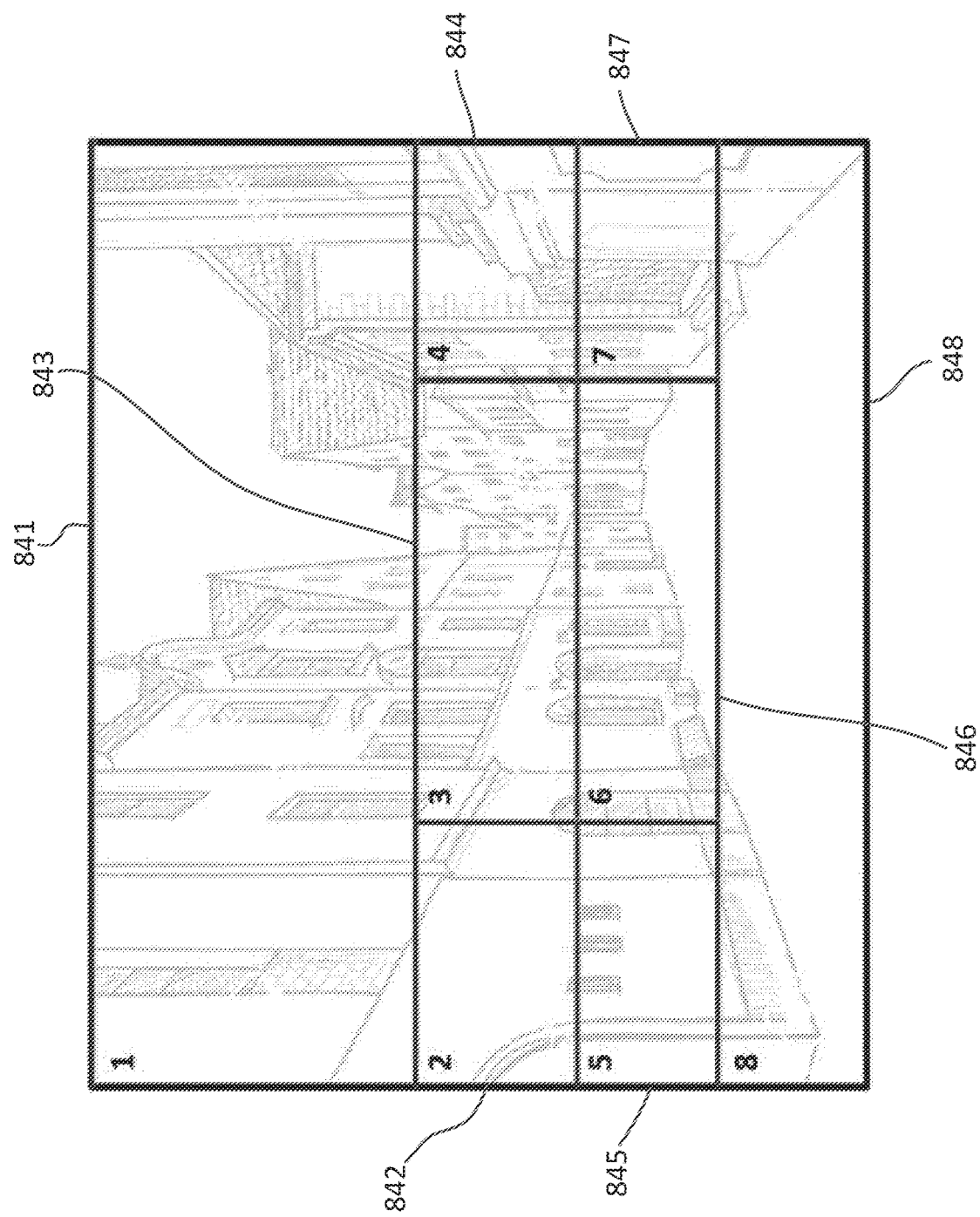
FIG. 10 illustrates an example picture for processing.

An example of such benefit is described below with reference to FIG. 10, which illustrates a picture 840 of a street in a village that includes first through eighth tile groups 841-848, with respective tile groups IDs 1-8. In such example, the picture 840 is assumed to be captured by a surveillance camera.

In cases, a decoder or MANE may be informed by external, non-video coding means that a certain tile group of the picture 840 is not required to be reconstructed for a certain application. For example, as illustrated in FIG. 10, the tile group 842 covers mostly walls. Thus, a configurator of the surveillance system may consider that area not relevant for surveillance. Accordingly, while the surveillance camera may be encoding all of the tile groups 841-848, the tile group 842 with the ID 2 may not be required for the application. In this regard, if the bitstream created by the surveillance camera was routed through one or more MANES to its final destination, the tile group 842 can removed by the one or more of the MANEs.

Absent the disclosed subject a of embodiments of the present disclosure, removal of the tile group 842 would require, as a minimum, that payload of the NAL unit (slice or tile) be parsed, to the extent required, to extract the macroblock/CU address of the first macroblock in the tile. Depending on the video coding technology or standard in use, and as described above, that may require both the processing of variable length codewords and the keeping of parameter set context in the MANE; both undesirable from an implementation and computational complexity viewpoint.

In contrast, in embodiments of the present disclosure a MANE may obtain all information necessary to identify which tile is carried by the NAL unit through NAL unit header processing of binary coded codewords. Accordingly, embodiments of the present disclosure may avoid problems of the related art, while also providing easily identifiable/parseable syntax elements identifying a tile group or other picture segment in high level syntax structures.

Figure 11:
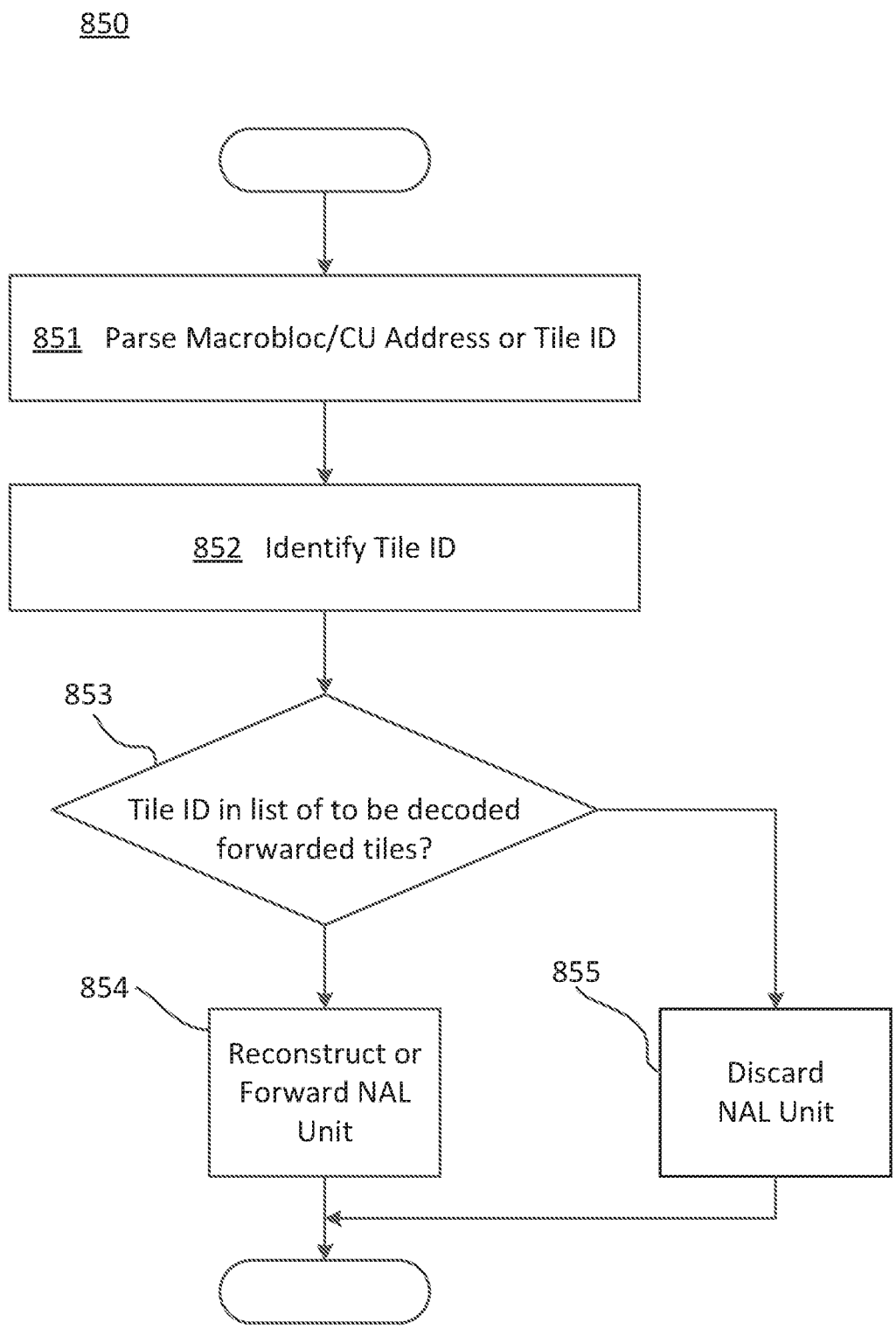
FIG. 11 illustrates a process for decoding in accordance with an embodiment.

Referring to FIG. 11, a decoder or MANE can implement embodiments of the present disclosure by performing process 850 as described below.

The decoder or MANE may parse, from a video bitstream, a NAL unit header comprising a syntax element covering macroblock/CU address or tile group ID (851). Using that information, the decoder or MANE can identify a tile group ID (852). The tile group ID may be coded directly, or the decoder/MANE can match a priori information about the tile layout, as established by, for example, decoding parameter sets and following activation sequences, with the macroblock/CU address coded in the NAL unit header. The decoder or the MANE can compare the tile ID against a list of tiles that require reconstruction or forwarding, by decoder or MANE, respectively (853). If there is a match, the decoder can reconstruct, or the MANE can forward, the NAL unit carrying the tile (854). If, however, there is no match, the decoder or MANE can discard the NAL unit (855). In an embodiment, the decoder or MANE discards the NAL unit silently.

In embodiments of the present disclosure, at least one processor may encode pictures in accordance with tile group and tile partitioning design of the present disclosure and send a coded video bitstream, that includes one or more encoded tile groups and tiles, to one or more decoders and MANEs for decoding in accordance with the tile grop and tile partitioning design of the present disclosure.

The techniques for encoding and decoding, including tile and tile group identification, described above, can be implemented as computer software using computer-readable instructions and physically stored in one or more computer-readable media. For example, FIG. 12 shows a computer system 900 suitable for implementing embodiments of the disclosed subject matter.

The techniques, described above, can be implemented as computer software using computer-readable instructions and physically stored in one or more computer-readable media. For example, FIG. 12 shows a computer system 900 suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 12 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there can also be tactile feedback devices that do not serve as input devices). For example, such devices may be audio output devices (such speakers 909, headphones (not depicted)), visual output devices (such as screens 910 to include CRT screens, LCD screens, plasma screens, OLED screens, each with or without touch-screen input capability, each with or without tactile feedback capability some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth.

Certain networks commonly require external network interface adapters that attached to certain general purpose data ports or peripheral buses 949 (such as, for example USB ports of the computer system 900, others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of imitation, the computer system having architecture 900, and specifically the core 940 can provide functionality as a result of processor(s) (including CPUs, CPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor, the method comprising:
   receiving a coded video stream comprising a picture partitioned into a plurality of tile groups corresponding to respective network abstraction layer (NAL) units, wherein each of the plurality of tile groups includes at least one tile;
   parsing, from one or more codewords in a NAL unit header, a value of an identifier for a corresponding NAL unit;
   if the value of the identifier for the corresponding NAL unit is not in a list of values, discarding the corresponding NAL unit without reconstructing a corresponding tile group; and
   if the value of the identifier for the corresponding NAL unit is in the list of values:
      identifying a tile group from the plurality of tile groups using the value of the identifier;
      determining, based on a syntax element value in a picture parameter set (PPS) of the coded video stream, that a rectangular mode is used for the picture in which the tile group has a rectangular shape; and
      in accordance with the determination that the rectangular mode is used for the picture, identifying a tile group size for the tile group based on a second syntax element in the PPS; and
      reconstructing the tile group using the tile group size.

2. The method of claim 1, wherein the second syntax element indicates a respective corner of the tile group.

3. The method of claim 1, wherein:
   the coded video stream received further comprises an indicator, in a parameter set or a tile group header, that indicates a number of tiles included in the tile group, and
   the method further comprises identifying positions of corners of the tile group in the picture based on counting the number of tiles in a raster-scan order.

4. The method of claim 1, wherein:
the coded video stream received further comprises an indicator that indicates whether the tile group is a motion-constraint tile set or the tile group includes a plurality of motion-constraint tiles, and
the method further comprises identifying whether the tile group is the motion-constraint tile set or includes the plurality of motion-constraint tiles based on the indicator.

5. A system for decoding a coded video stream, the system comprising:
memory configured to store computer program code; and
at least one processor configured to access the computer program code, and operate as instructed by the computer program code, the computer program code including instructions for:
receiving a coded video stream comprising a picture partitioned into a plurality of tile groups corresponding to respective network abstraction layer (NAL) units, wherein each of the plurality of tile groups includes at least one tile;
parsing, from one or more codewords in a NAL unit header, a value of an identifier for a corresponding NAL unit;
if the value of the identifier for the corresponding NAL unit is not in a list of values, discarding the corresponding NAL unit without reconstructing a corresponding tile group; and
if the value of the identifier for the corresponding NAL unit is in the list of values:
identifying a tile group from the plurality of tile groups using the value of the identifier;
determining, based on a syntax element value in a picture parameter set (PPS) of the coded video stream, that a rectangular mode is used for the picture in which the tile group has a rectangular shape; and
in accordance with the determination that the rectangular mode is used for the picture, identifying a tile group size for the tile group based on a second syntax element in the PPS; and
reconstructing the tile group using the tile group size.

6. The system of claim 5, wherein the second syntax element indicates a respective corner of the tile group.

7. The system of claim 5, wherein the computer program code further includes instructions for identifying positions of corners of the tile group based on an indicator included in the coded video stream, and further based on counting a number of tiles included in the tile group in a raster-scan order.

8. The system of claim 5, wherein the computer program code further includes instructions for identifying whether the tile group is a motion-constraint tile set or includes a plurality of motion-constraint tiles, based on an indicator included in the coded video stream.

9. A non-transitory computer-readable medium storing computer instructions that, when executed by at least one processor, cause the at least one processor to:
receive a coded video stream comprising a picture partitioned into a plurality of tile groups corresponding to respective network abstraction layer (NAL) units, wherein each of the plurality of tile groups includes at least one tile;
parse, from one or more codewords in a NAL unit header, a value of an identifier for a corresponding NAL unit;
if the value of the identifier for the corresponding NAL unit is not in a list of values, discard the corresponding NAL unit without reconstructing a corresponding tile group; and
if the value of the identifier for the corresponding NAL unit is in the list of values:
identify a tile group from the plurality of tile groups using the value of the identifier;
determine, based on a syntax element value in a picture parameter set (PPS) of the coded video stream, that a rectangular mode is used for the picture in which the tile group has a rectangular shape; and
in accordance with the determination that the rectangular mode is used for the picture, identify a tile group size for the tile group based on a second syntax element in the PPS; and
reconstruct the tile group using the tile group size.

10. The method of claim 1, wherein:
the coded video stream further comprises a flag that explicitly indicates whether a tile group ID for the tile group is explicitly signaled in the PPS, and
when the flag indicates that the tile group ID is explicitly signaled in the PPS, the PPS further comprises a second indicator that indicates a bit length of the tile group ID.

11. The method of claim 1, wherein the coded video stream further comprises an indicator that indicates whether two tile groups of the plurality of tile groups are allowed to overlap each other.

12. The method of claim 1, further comprising obtaining, from the coded video stream, a first indicator that indicates the total number of the tile group rows.

13. The method of claim 1, wherein the coded video stream further comprises a second picture partitioned into one or more second tile groups, and the method further comprises:
obtaining an indicator that indicates whether the one or more second tile groups consist of a single tile group;
in accordance with the indicator indicating that the one or more second tile groups consist of the single tile group, reconstructing the single tile group; and
in accordance with the indicator indicating that the one or more second tile groups comprise two or more second tile groups, identifying a respective tile group size for each tile group in the two or more second tile groups.

14. The method of claim 1, further comprising determining an address of the tile group based on a second identifier in the coded video stream.

15. The method of claim 1, further comprising determining an address of the tile group based on a second identifier received outside of the coded video stream.

16. The method of claim 1, wherein the one or more codewords in the NAL unit header are coded without requiring state information.

17. The method of claim 1, wherein the one or more codewords in the NAL unit header are coded in a fixed length, binary code.

18. The method of claim 1, wherein the list of values correspond to a list of tiles to be reconstructed.

19. The method of claim 1, wherein the value of the identifier corresponds to a tile group ID for the tile group.

20. The method of claim 1, wherein the NAL unit header further comprises one or more codewords indicating a unit type for the corresponding NAL unit.

* * * * *